US011007885B2

(12) United States Patent
Koolen et al.

(10) Patent No.: US 11,007,885 B2
(45) Date of Patent: May 18, 2021

(54) CHARGER FOR ELECTRIC VEHICLES WITH DISTRIBUTED POWER CONVERTER ARBITRATION

(71) Applicant: ABB Schweiz AG, Baden (CH)

(72) Inventors: Gerardus Johannes Karel Marijke Koolen, Aarle Rixtel (NL); Jean-Pierre Albers-Van-Der-Linden, Mierlo (NL); Lars Peter Bech, Schiedam (NL)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/675,769

(22) Filed: Nov. 6, 2019

(65) Prior Publication Data
US 2020/0139827 A1  May 7, 2020

Related U.S. Application Data

(62) Division of application No. 15/875,520, filed on Jan. 19, 2018, now Pat. No. 10,807,485, which is a (Continued)

(30) Foreign Application Priority Data

Nov. 6, 2013 (EP) .................................. 13191822

(51) Int. Cl.
*B60L 53/00* (2019.01)
*B60L 53/10* (2019.01)
(Continued)

(52) U.S. Cl.
CPC ............... *B60L 53/11* (2019.02); *B60L 53/31* (2019.02); *B60L 53/62* (2019.02); *B60L 53/63* (2019.02);
(Continued)

(58) Field of Classification Search
CPC .......... B60L 53/11; B60L 53/62; B60L 53/63; B60L 53/64; B60L 53/14; B60L 2210/30;
(Continued)

(56) References Cited

U.S. PATENT DOCUMENTS 4,849,682 A * 7/1989 Bauer .................... H02J 7/0024
  320/106
5,598,084 A * 1/1997 Keith ...................... B60L 53/16
  320/109
(Continued)

FOREIGN PATENT DOCUMENTS

JP       2012005341 A     1/2012
JP        201370500 A     4/2013
(Continued)

OTHER PUBLICATIONS

European Search Report dated Apr. 2, 2014; European Patent Application No. 13191822.9; 8 pgs.
(Continued)

*Primary Examiner* — Naum Levin
(74) *Attorney, Agent, or Firm* — Taft Stettinius & Hollister LLP (57) ABSTRACT

The present application relates to a charger for electric vehicles, comprising at least two power exchange ports for vehicles, each port comprising a data communication connection for at least receiving a power request from a vehicle, and a power exchange connection for delivering power to a vehicle; at least one grid connection for receiving electric power; a data communication bus, for communicating the power request from the vehicles to a plurality of autonomously controllable power converters, each for converting power from the grid connection to a suitable level for charging a vehicle; and each of the power converters comprises a data communication device, connected to the data bus, and configured for receiving power requests from
(Continued)

vehicles; and configured for indicating its available power via the data bus.

6 Claims, 12 Drawing Sheets

Related U.S. Application Data division of application No. 14/535,018, filed on Nov. 6, 2014, now Pat. No. 9,908,421.

(51) Int. Cl.
*B60L 53/63* (2019.01)
*B60L 53/62* (2019.01)
*B60L 53/31* (2019.01)
*B60L 53/64* (2019.01)

(52) U.S. Cl.
CPC ........... *B60L 53/64* (2019.02); *B60L 2210/30* (2013.01); *Y02E 60/00* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y04S 10/126* (2013.01)

(58) Field of Classification Search
CPC ........ B60L 53/31; Y02T 90/127; Y02T 90/14; Y02T 90/121; Y02T 90/128; Y02T 10/7072; Y02T 90/12; Y02T 90/16; Y02T 10/72; Y04S 10/126
See application file for complete search history.

(56) References Cited

U.S. PATENT DOCUMENTS

| | | | |
|---|---|---|---|
| 7,135,836 B2 | 11/2006 | Kutkut et al. | |
| 7,256,516 B2 | 8/2007 | Buchanan et al. | |
| 7,844,370 B2 | 11/2010 | Pollack et al. | |
| 8,102,149 B2 | 1/2012 | Hwang | |
| 8,278,881 B2 | 10/2012 | Woody et al. | |
| 8,378,627 B2 | 2/2013 | Asada et al. | |
| 8,633,619 B2* | 1/2014 | Robinson | H02J 7/00036 307/115 |
| 8,643,330 B2 | 2/2014 | Nergaard et al. | |
| 8,760,115 B2 | 6/2014 | Kinser et al. | |
| 8,810,198 B2* | 8/2014 | Nergaard | B60L 53/14 320/109 |
| 8,890,474 B2 | 11/2014 | Kim et al. | |
| 8,912,753 B2 | 12/2014 | Pudar et al. | |
| 8,952,656 B2 | 2/2015 | Tse | |
| 8,963,494 B2* | 2/2015 | Kishiyama | G01R 31/382 320/109 |
| 9,000,721 B2 | 4/2015 | Hernandez et al. | |
| 9,026,347 B2 | 5/2015 | Gadh et al. | |
| 9,045,048 B2* | 6/2015 | Yukizane | H02J 13/0062 |
| 9,168,841 B2* | 10/2015 | Kawai | B60L 53/11 |
| 9,193,272 B2* | 11/2015 | Fassnacht | B60L 53/14 |
| 9,248,753 B2 | 2/2016 | Bouman | |
| 9,365,127 B2* | 6/2016 | Olsson | B60L 8/003 |
| 9,371,008 B2 | 6/2016 | Bouman | |
| 9,637,017 B2* | 5/2017 | Sung | B60L 11/1824 |
| 9,881,286 B2* | 1/2018 | Naito | H02J 7/0027 |
| 10,137,796 B2* | 11/2018 | Huang | H02J 3/32 |
| 2004/0010592 A1* | 1/2004 | Carver | H04L 47/70 709/226 |
| 2004/0189251 A1 | 9/2004 | Kutkut et al. | |
| 2008/0039979 A1 | 2/2008 | Bridges et al. | |
| 2009/0091291 A1 | 4/2009 | Woody et al. | |
| 2010/0228405 A1 | 9/2010 | Morgal et al. | |
| 2011/0006603 A1* | 1/2011 | Robinson | H02J 7/0021 307/31 |
| 2011/0106329 A1 | 5/2011 | Donnelly et al. | |
| 2011/0115425 A1* | 5/2011 | Olsson | B60L 8/006 320/101 |
| 2011/0145141 A1 | 6/2011 | Blain | |
| 2011/0285345 A1* | 11/2011 | Kawai | H02J 7/007 320/107 |
| 2012/0074893 A1 | 3/2012 | Cole | |
| 2012/0200256 A1 | 8/2012 | Tse | |
| 2012/0286720 A1* | 11/2012 | Fassnacht | B60L 1/006 320/105 |
| 2013/0057209 A1 | 3/2013 | Nergaard et al. | |
| 2013/0057210 A1 | 3/2013 | Nergaard et al. | |
| 2013/0069292 A1 | 3/2013 | Spraines et al. | |
| 2013/0069592 A1 | 3/2013 | Bouman | |
| 2013/0103191 A1 | 4/2013 | Bouman | |
| 2013/0179061 A1 | 7/2013 | Gadh et al. | |
| 2013/0257146 A1* | 10/2013 | Nojima | B60L 53/65 307/9.1 |
| 2013/0278225 A1* | 10/2013 | Dietze | B60L 58/13 320/137 |
| 2013/0346308 A1* | 12/2013 | Naito | B60L 53/305 705/41 |
| 2015/0061569 A1* | 3/2015 | Alexander | B60L 3/0092 320/101 |
| 2015/0165917 A1* | 6/2015 | Robers | B60L 55/00 320/109 |
| 2016/0185246 A1* | 6/2016 | Paul | B60L 53/53 320/106 |

FOREIGN PATENT DOCUMENTS

| | | | |
|---|---|---|---|
| WO | WO-2005008808 A2 * | 1/2005 | ............... H02J 1/14 |
| WO | 2011145939 A2 | 11/2011 | |
| WO | 2013100764 A1 | 7/2013 | |

OTHER PUBLICATIONS

Yutthana Kanthaphayao et al., "Distributed Control of Parallel AC to DC Converter", IEEE Proceedings, Department of Electrical Engineering, University of Technology North Bangkok, Thailand, and Rajamangal University of Technology, Chiang Mai, Thailand, 2009, 8 pgs.

* cited by examiner

CHARGER FOR ELECTRIC VEHICLES WITH DISTRIBUTED POWER CONVERTER ARBITRATION

BACKGROUND

The present invention relates to a charger for electric vehicles, more in particular to a charger comprising multiple power converters.

Chargers for electric vehicles comprising multiple power converters are known in the art. An advantage of the use of multiple converters in one charger is that the number of active converters can be set according to a momentary power demand. Power converters in use may be operated in an energy efficient, often maximal power of duty cycle mode.

An example of such charger is given in the U.S. Pat. No. 7,135,836, wherein a vehicle charger with multiple power converters and multiple power exchange ports for batteries is disclosed. The converter comprises a central, so called system level, controller and interface for controlling the power levels at which the converters function.

Although the above described topology fulfils a certain need, increasing communication facilities of electric vehicles have raised a demand for a more advanced method of control for a charger for electric vehicles.

The 2009 IEEE proceedings "Distributed Control of Parallel AC to DC Converter" proposes a different way of controlling power converters of an AC/DC converter, wherein each convelter module comprises its own controller. The power converters outputs are used for powering a common load, which is not necessarily an electric vehicle that requires quick charging. This system however does not enable charging of multiple vehicles at one time.

SUMMARY

It is a goal of the present invention to provide such improved power converter, or at least to provide a useful alternative to the state of the art chargers for quick charging electric vehicles.

The invention thereto proposes a charger for electric vehicles, comprising at least two power exchange ports for vehicles, each port comprising a data communication connection for at least receiving a power request from a vehicle, and a power exchange connection for delivering power to a vehicle at least one grid connection for receiving electric power, a data communication bus, for communicating the power request from the vehicles to a plurality of autonomously controllable power converters, each for converting power from the grid connection to a suitable level and wave-form for charging a vehicle, wherein each of the power converters comprises a data communication device, connected to the data bus, and configured for receiving power requests from vehicles; and configured for indicating its available power via the data bus.

By providing each of the power converters with a communication device, an adequate and efficient communication with a vehicle to be charged may be obtained. The charger according to the present invention provides the advantage that vehicles may have direct communication with a power converters controller, which enables the charger to continuously adapt itself to optimal settings for that specific moment and/or combination of vehicles to be charged.

A further advantage of the charger according to the present invention is that software maintenance of the controllers of the power converters is made easier, since all controllers can be addressed directly. With respect to the state of the art patent mentioned above one advantage is that there is no need for a master controller anymore. The charger according to the present invention may be operated as follows. When one or more vehicles connect to the charger in order to be charged, the sum of power requested by vehicles at power exchange ports of the charger is determined, as well as the sum of power available by power converters comprised by the charger. If the sum of the power requested is larger than the sum of the available power, the available power of at least one power converter is allocated to the power exchange port a requesting vehicle is coupled to. Then the remaining sum of power available by power converters comprised by the charger is determined, and if the sum of the power requested is larger than the sum of the available power; a negotiation is performed with the vehicle. Next, the available power of at least one power converter is delivered to the power exchange port a requesting vehicle is coupled to.

To fulfil the request of the vehicle, the controller chooses the power converters to deliver this power. This choice is made using a deterministic algorithm. Since all controllers use the same selection algorithm, they know each other's choices without the need for further communication.

In an embodiment, the data communication connections of the power exchange ports are provided with a data communication device, that is configured for retrieving a power request from a vehicle, making the request available to the controllable power converters via the communication bus and receiving available power indications from the power converters.

A vehicle to be charged may be coupled to a power exchange port and a corresponding data communication port of the charger. Then the data communication device of the port the vehicle is coupled to receives a request from the vehicle, comprising requirements the vehicle sets to the charging, like a required power, a maximum duration of the charging, and protocols according to which the vehicle is able to be charged.

In the above example, the vehicle is "leading", that is: the charger responds to a demand from a vehicle. It is also possible that the charger communicates the available power to a vehicle and that the vehicle then indicates how much of the available power it requires. In that case the charger is operated as follows, wherein the data communication connections of the power exchange ports are provided with a data communication device, that is configured for receiving available power indications from the power converters, making the request available to the vehicle via the communication bus and retrieving a power request based on the available power from a vehicle.

In yet a further embodiment, the data communication devices are configured for determining if at least one power converter has power available for at least partly fulfilling a request from a vehicle; coupling a power output of at least one power converter to a power exchange connection of a power exchange port for a vehicle if power is available; and negotiating power conversion settings with the autonomously controllable power converters in response to a power request from a vehicle. In such way, the request from a vehicle is directly and independently dealt with by the port that the vehicle is connected to.

In a further embodiment, the data communication devices are configured for coupling power outputs of available power converters to a power exchange connection until the power request is fulfilled or until no more power converters are available.

When a power request is received from a vehicle, the communication device communicates the request via the communication bus, and it is received by all power converters. The controller estimates whether the converters can deliver (a part of) the requested power. Since a galvanic separation is required between multiple vehicles coupled to one charger, a power converter can only be coupled to one power exchange. When one power converter can deliver the requested power, it indicates so, and it is coupled to the power exchange port. When the requested power is larger than the power that can be delivered by one power converter, a second and further converter may be coupled to the power exchange port. In such case one or more number of power converters may operate at their maximum power level and/or duty cycle, and one last power converter may be operated on a power level below its maximum. This is done for obtaining a maximum efficiency, since power converters normally operate most efficient at their maximum power level and/or full duty cycle.

In yet a further embodiment, the data communication devices are configured for verifying if there are available power converters after a predetermined time interval or after a predetermined event when a power request was or is more than a maximum power available from a power converter; and if there are available power converters, coupling a power output of at least one of such power converters to the power exchange connection of the power exchange port for the vehicle that requests the power.

If a vehicle arrived at a time that the power it requests was not available, and it was set to a lower level than desired, it is advantageous when the available power is determined on a regular basis, so new negotiations can be started as soon as a change in the situation (for instance because a vehicle has left) occurs.

In a further embodiment the charger comprises a data storage coupled to the data communication bus, the data storage comprising system limitation data, such as a power limitation of the grid connection, peak shaving requirements or energy costs.

Furthermore a communication port for communication with the power grid may be present.

BRIEF DESCRIPTION OF THE DRAWINGS

The application will be elucidated into more detail with reference to the following figures.

DETAILED DESCRIPTION

Figure 1:
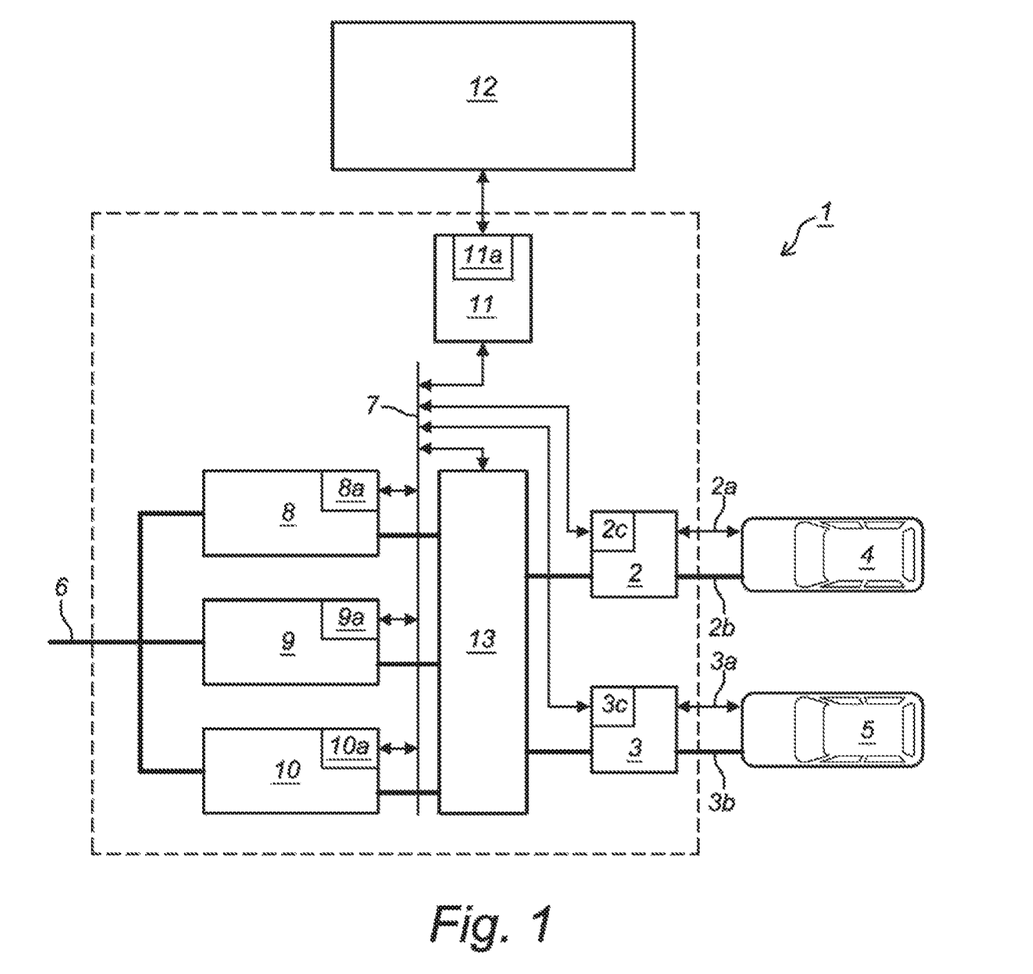
FIG. 1 shows a schematic view of a charger according to the present invention.

FIG. 1 shows a schematic view of a charger 1 according to the present invention, comprising two power exchange ports 2, 3 for vehicles 4, 5, each port comprising a data communication connection 2a, 3a for at least receiving a power request from a vehicle, and a power exchange connection 2b, 3b for delivering power to a vehicle; a grid connection 6 for receiving electric power, a data communication bus 7, for communicating the power request from the vehicles to a plurality of autonomously controllable power converters 8, 9, 10, each for converting power from the grid connection to a suitable level and wave-form for charging a vehicle, wherein each of the power converters comprises a data communication device 8a, 9a, 10a, connected to the data bus 7, and configured for receiving power requests from vehicles 4, 5and for indicating its available power via the data bus 7.

Data bus 7 provides a way to share relevant information from the power modules, vehicle interfaces and backend interface. Information is shared in such a way that these mentioned devices have up to date information. With this information specific choices are being made such as allocation of power modules to vehicle interfaces.

The data communication connections of the power exchange ports are provided with a data communication device 2c, 3c, that is configured for retrieving a power request from a vehicle, making the request available to the controllable power converters via the communication bus 7 and receiving available power indications from the power converters 8, 9, 10.

The charger further comprises a data storage 11 coupled to the data communication bus 7, the data storage comprising system limitation data, such as a power limit of the grid connection, peak shaving requirements or energy costs, as well as a communication port 11a for communication with the back-end of the power grid 12.

The data communication devices 2c, 3c, 8a, 9a, 10a are configured for determining if at least one power converter has power available for at least partly fulfilling a request from a vehicle, coupling a power output of at least one power convelter to a power exchange connection of a power exchange port for a vehicle by means of a matrix with switches 13 if power is available and negotiating power conversion settings with the autonomously controllable power converters in response to a power request from a vehicle.

The data communication devices 2c, 3c, 8a, 9a, 10a are configured for coupling power outputs of available power converters to a power exchange connection until the power request is fulfilled or until no more power converters are available.

Furthermore the data communication devices 2c, 3c, 8a, 9a, 10a are configured for verifying if there are available power converters after a predetermined time interval or after a predetermined event when a power request was or is more than a maximum power available from a power converter and if there are available power converters, coupling a power output of at least one of such power converters to the power exchange connection of the power exchange port for the vehicle that requests the power.

FIG. 2 shows a block diagram of a method according to the present invention. In general, the method comprises the steps of determining the sum of power requested by vehicles at power exchange ports of the charger, determining the sum of power available by power converters comprised by the charger, if the sum of the power requested is larger than the sum of the available power, and allocate the available power of at least one power converter to the power exchange port a requesting vehicle is coupled to, such that the power request of said vehicle is met, and determine the remaining sum of power available by power converters comprised by the charger. If the sum of the power requested is larger than the sum of the available power a negotiation with the vehicle is performed and available power of at least one power converter is allocated to the power exchange port a requesting vehicle is coupled to.

FIGS. 2a-2k give a detailed example of a sequence of practical situations at the charger.

Figure 2A:
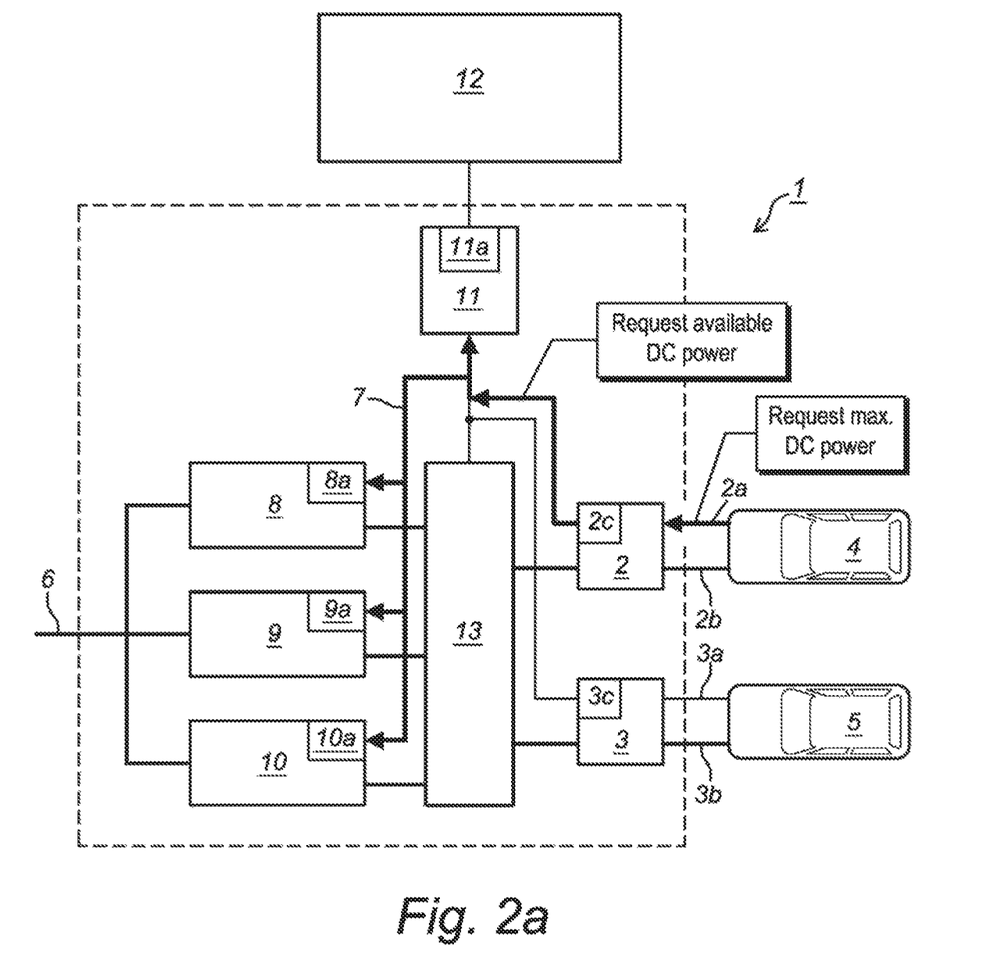
FIGS. 2a-2k give a detailed example of a sequence of practical situations at the charger.

FIG. 2a shows an initial situation wherein electric vehicle EV1 requests maximum DC power from the charger. Vehicle interface 1 sends requests to the power modules and the back-end interface for the available DC power.

Figure 2B:
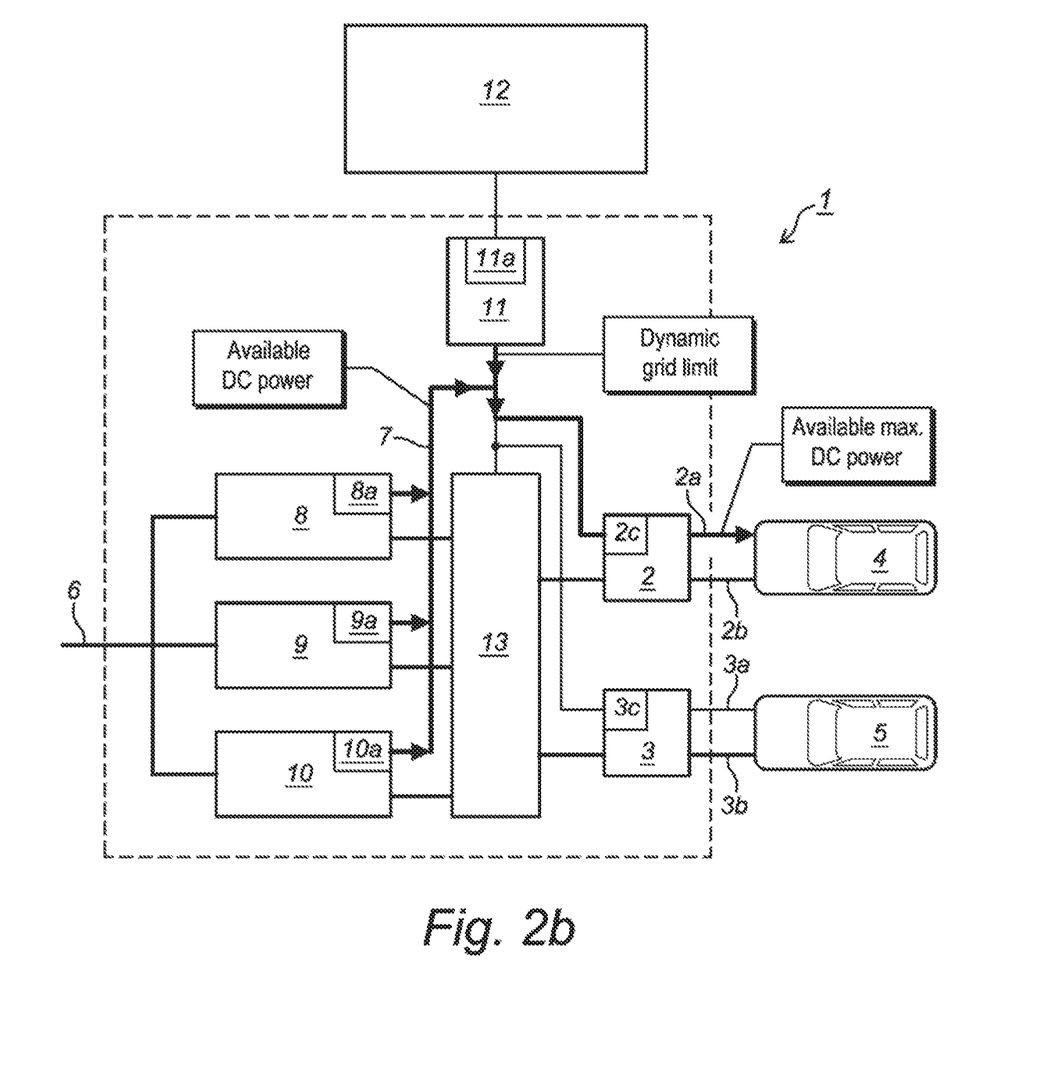

FIG. 2b shows a situation wherein each of the power is rated to 20 kW and 3 power modules are available. A dynamic grid limit is 50 kW, so the available max DC power is 50 k\V as well.

Figure 2C:
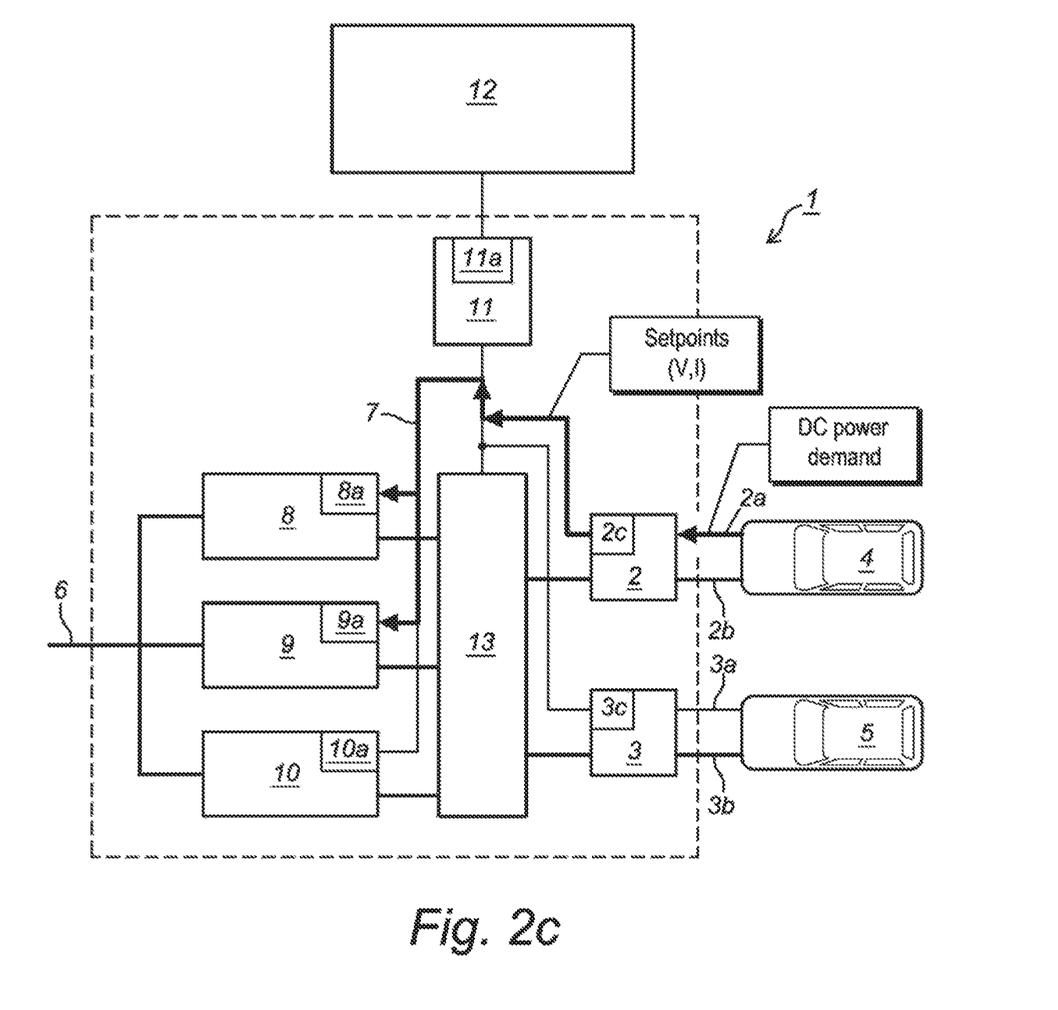

FIG. 2c shows that electric vehicle EV1 starts with a DC power demand of 40 kW. The vehicle interface 1 sends set points to two of the power modules. Electric vehicle EV1 is charged.

Figure 2D:
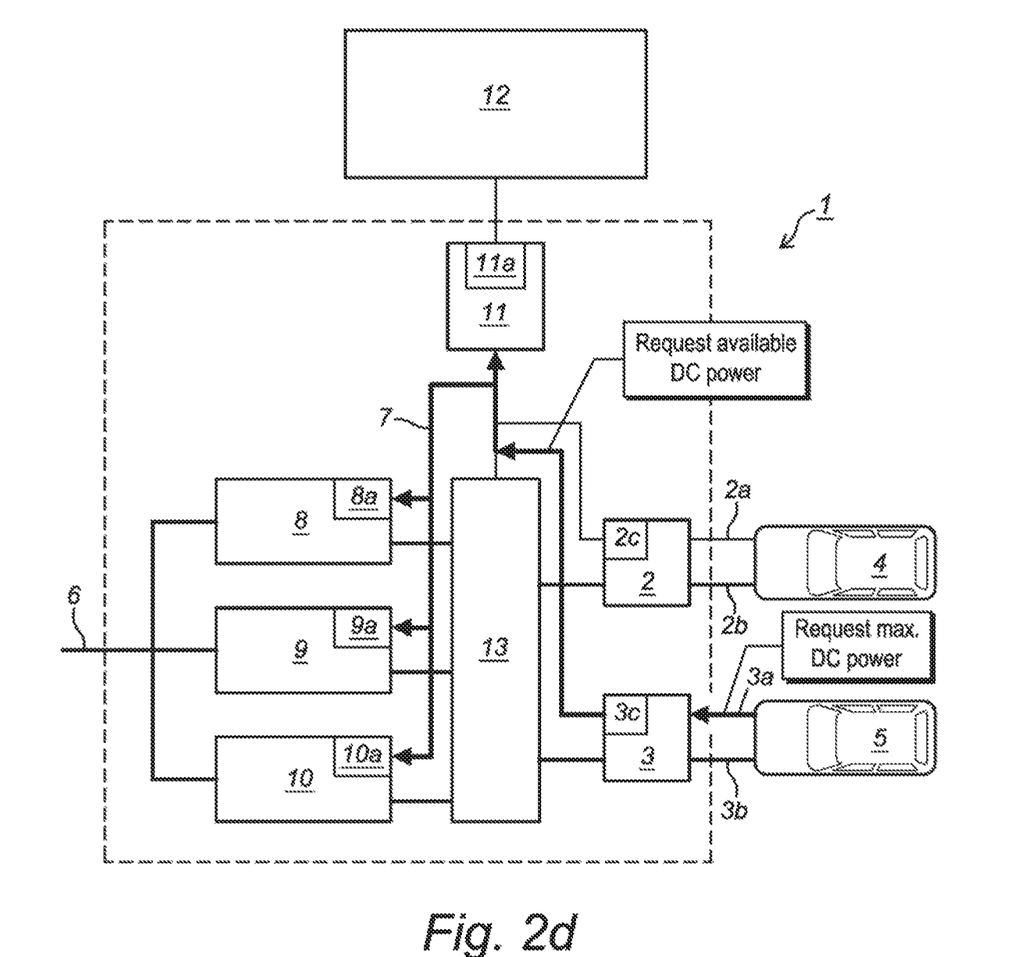

FIG. 2d shows that electric vehicle EV2 arrived later than electric vehicle EV1. Electric vehicle EV2 requests the maximum DC power from the charger. Vehicle interface 2 sends requests to the power modules and the back-end interface for the available DC power.

Figure 2E:
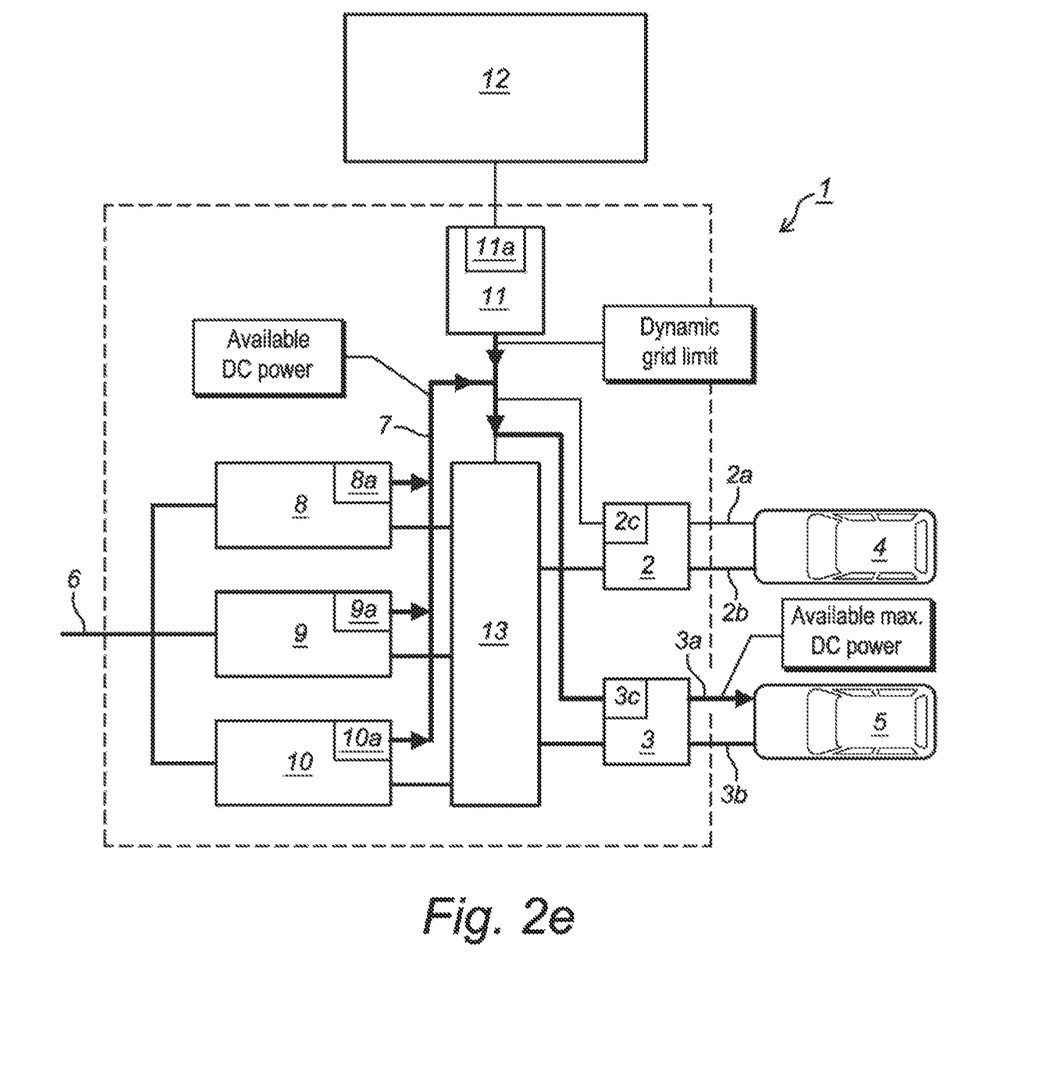

FIG. 2e shows that each of the power modules is rated to 20 kW and one power module is available, the others are used by vehicle interface 1. The dynamic grid limit is 50 kW, so the maximum available DC power 10 kW.

Figure 2F:
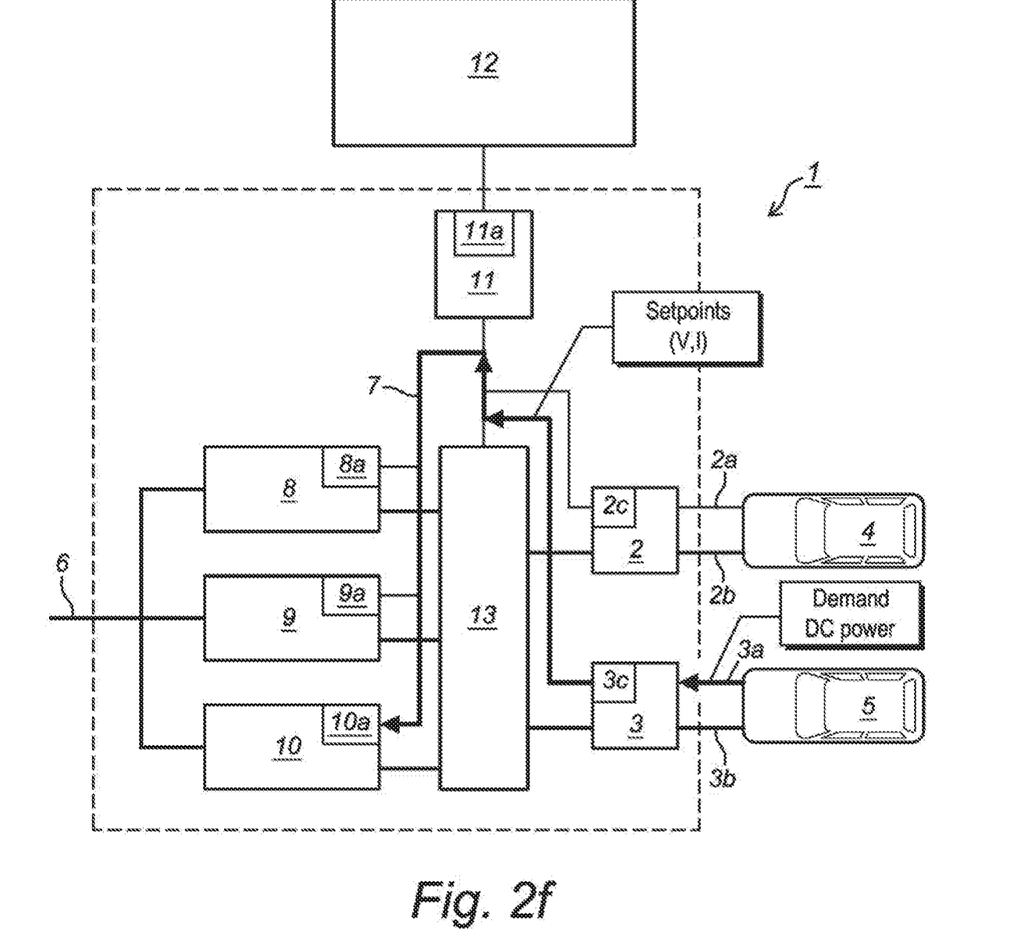

FIG. 2f shows that electric vehicle EV2 starts with a DC power demand of 10 kW. The vehicle interface 2 sends set points to one of the power modules. Electric vehicle EV2 is charged.

Figure 2G:
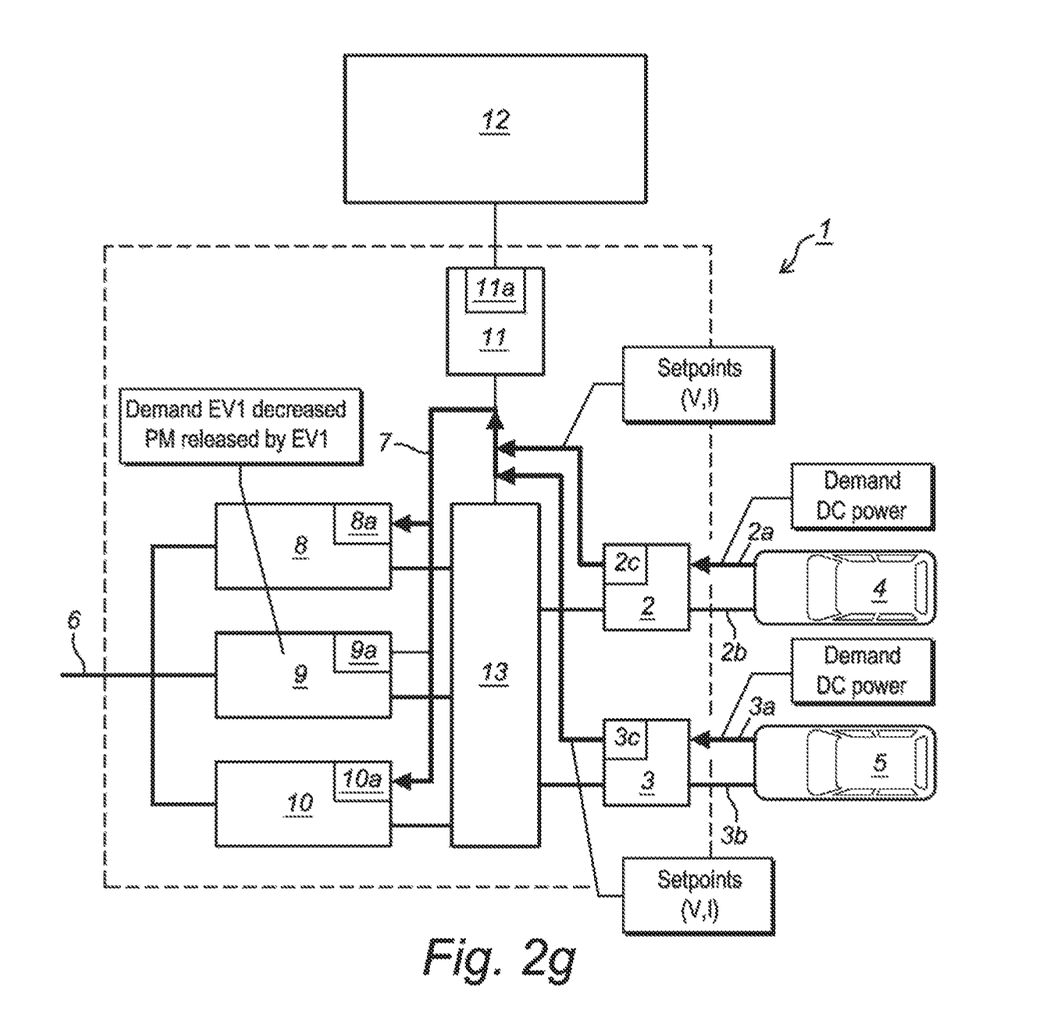

FIG. 2g shows that electric vehicle EV1 and 2 are being charged. The power demand of electric vehicle EV1 is decreased to 20 kW, therefore power module 2 is released by vehicle interface 1.

Figure 2H:
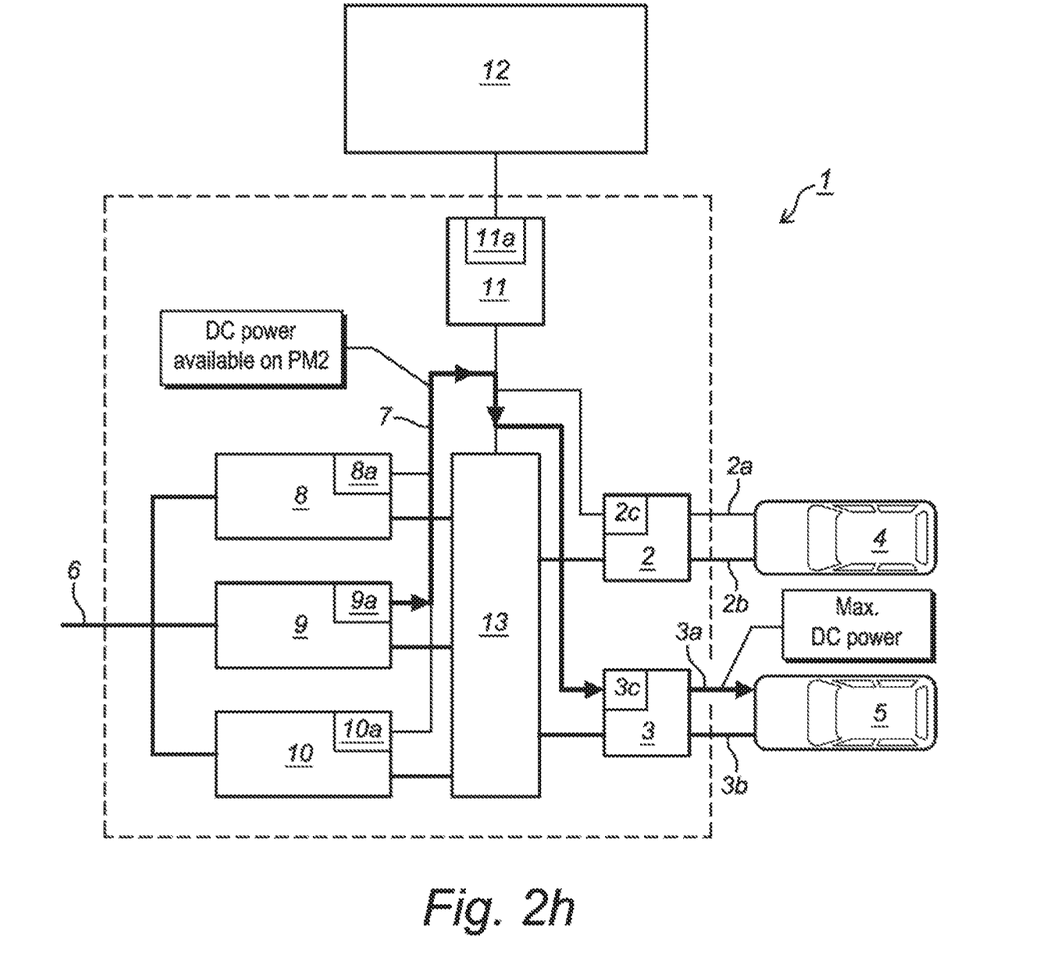

2h The availability of power module 2 is synchronized with interface 2, based on the available DC power a new max DC power (30 kW) is send to electric vehicle EV2.

Figure 2I:
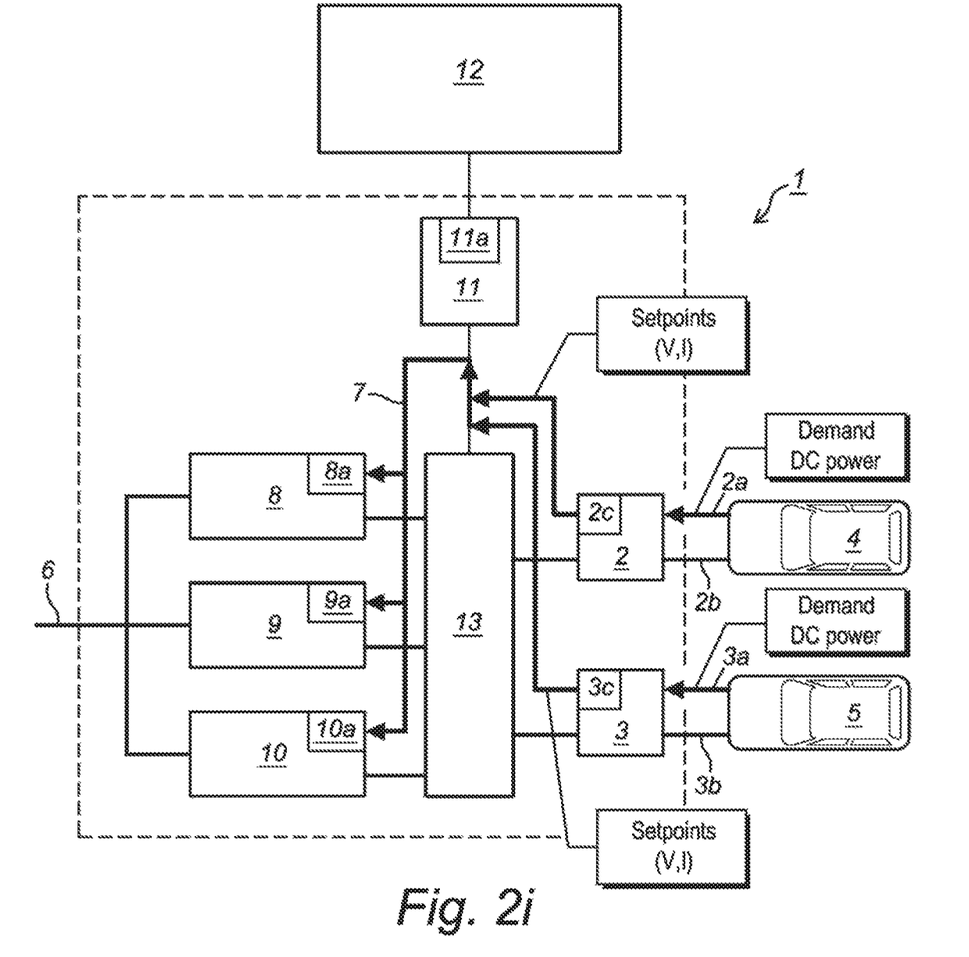

2i Electric vehicle EV2 increases its DC power demand to 30 kW. The vehicle interface 2 send set points to two of the power modules (PM2 and PM3). Electric vehicle EV2 is charged with higher power.

Figure 2J:
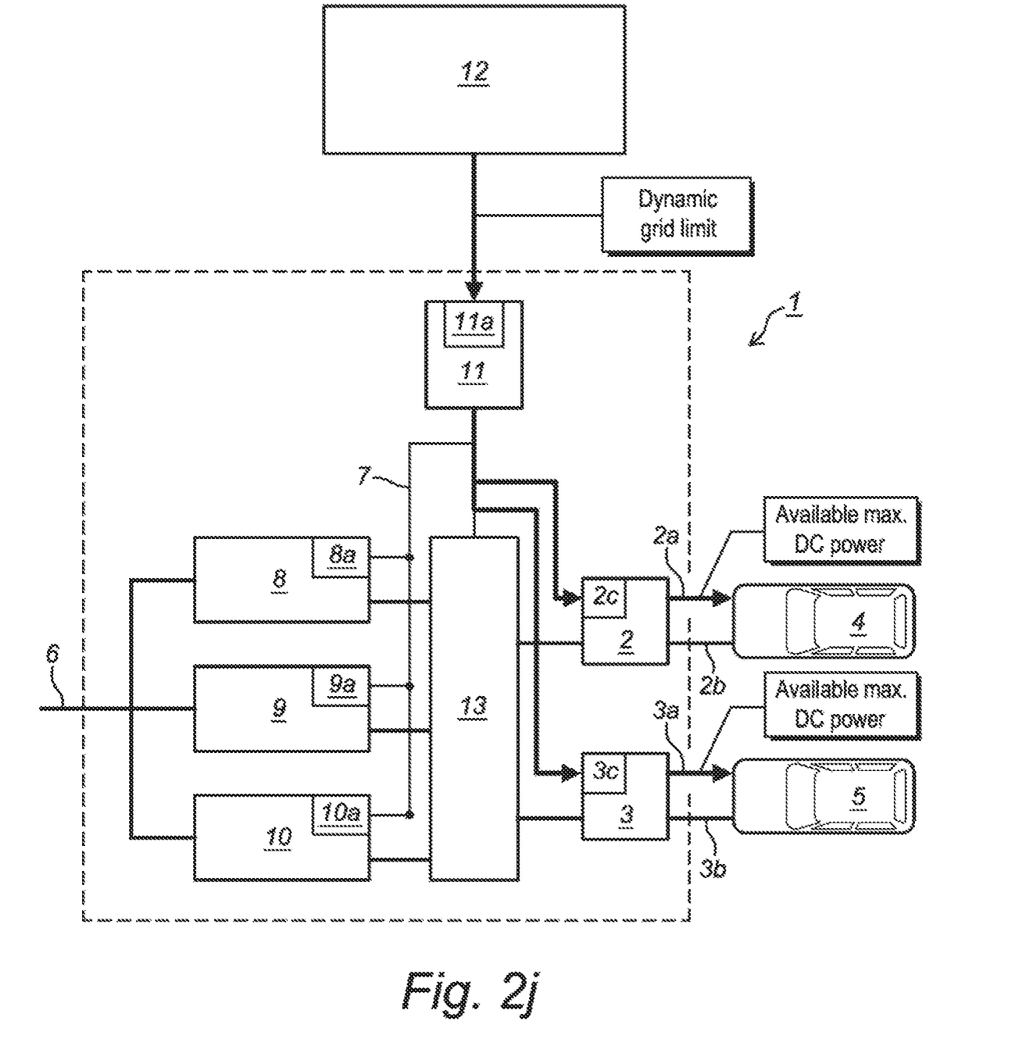

FIG. 2j shows that a new limit (60 kW) is received from the back-end server of the grid operator. The new limit is synchronized with the vehicles interfaces. The maximum available DC power communicated to the vehicles are 20 kW (EV1) and 40 kW (EV2).

Figure 2K:
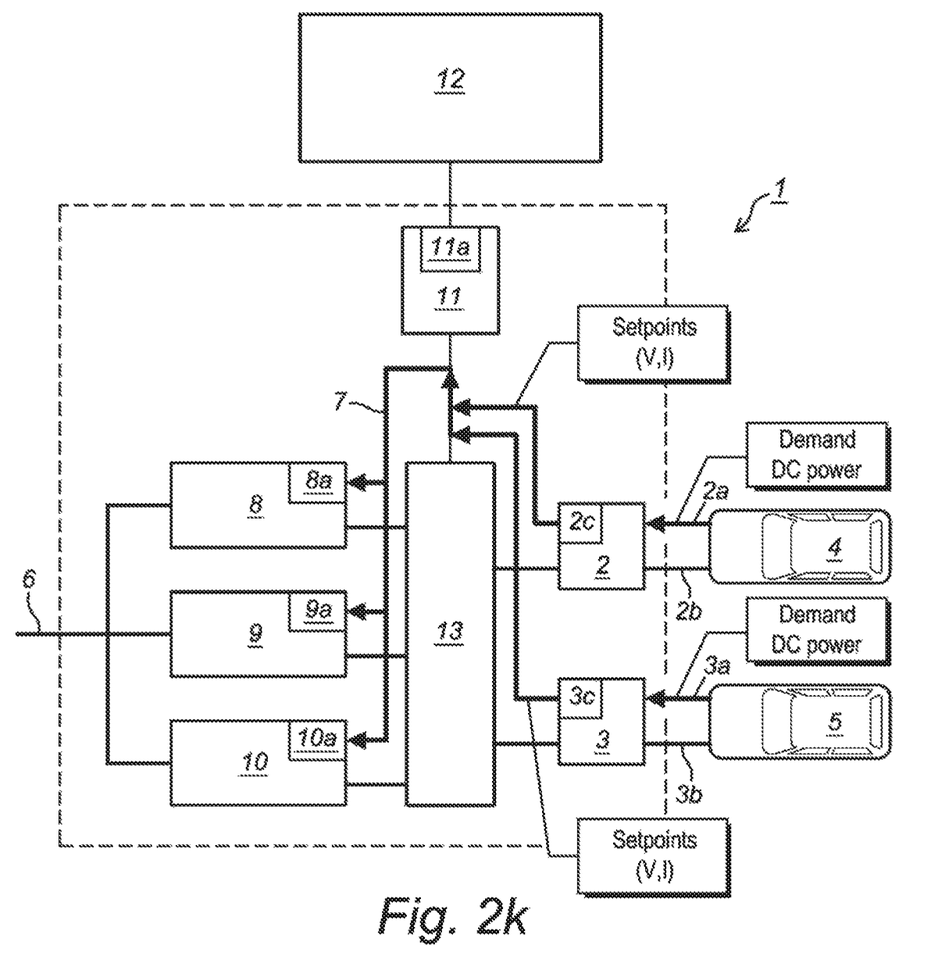

FIG. 2k shows that electric vehicle EV2 increases its DC power demand to 40 kW. Electric vehicle EV2 is charged with higher power.

The invention claimed is:

1. A method for operating a charger for electric vehicles, comprising:
communicating power requests from a plurality of vehicles through a data communication bus to a plurality of autonomously controllable power converters of the charger, each of the autonomously controllable power converters comprising a data communication device connected to the data communication bus;
determining a sum of the power requests by the plurality of vehicles at power exchange ports of the charger;
determining a sum of available power by the plurality of autonomously controllable power converters of the charger;
if the sum of the power requested is larger than the sum of the available power, allocate the available power evenly between the requesting vehicles.

2. The method according to claim 1, comprising:
allocate the available power of the plurality of autonomously controllable power converters to the power exchange port a requesting vehicle is coupled to, such that the power request of the vehicle is met, wherein the plurality of autonomously controllable power converters is paralleled.

3. The method according to claim 1, wherein the plurality of autonomously controllable power converters continuously adapt to optimal settings for a combination of the vehicles to be charged.

4. The method according to claim 1, characterized in that a master controller is not used for control of the autonomously controllable power converters.

5. The method according to claim 1, wherein each of the autonomously controllable power converters use a same selection algorithm such that each autonomously controllable power converter knows the selection choices of others of the autonomously controllable power converters without a need for further communication.

6. A method for operating a charger for electric vehicles, comprising:
communicating power requests from a plurality of vehicles through a data communication bus to a plurality of autonomously controllable power converters of the charger, each of the autonomously controllable power converters comprising a data communication device connected to the data communication bus;
determining a sum of the power requests by the plurality of vehicles at power exchange ports of the charger;
determining a sum of available power by the plurality of autonomously controllable power converters of the charger;
if the sum of the power requested is larger than the sum of the available power, allocate the available power evenly between the requesting vehicles;
characterized in that a master controller is not used for control of the autonomously controllable power converters;
wherein each of the autonomously controllable power converters use a same selection algorithm such that each autonomously controllable power converter knows the selection choices of others of the autonomously controllable power converters without a need for further communication, the plurality of autonomously controllable power converters continuously adapting to optimal settings for a combination of the vehicles to be charged.

* * * * *